(12) United States Patent
Barth et al.

(10) Patent No.: US 10,305,795 B1
(45) Date of Patent: May 28, 2019

(54) APPARATUS, SYSTEM, AND METHOD FOR IMPROVING THE PROCESS OF ESTABLISHING PEERING RELATIONSHIPS VIA INTERNET EXCHANGES

(71) Applicant: Juniper Networks, Inc., Sunnyvale, CA (US)

(72) Inventors: Jonathan C. Barth, Collegeville, PA (US); Nitin Kumar, Fremont, CA (US); Sunanda Kommula, Cupertino, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 64 days.

(21) Appl. No.: 15/726,592

(22) Filed: Oct. 6, 2017

(51) Int. Cl.
| | |
|---|---|
| *H04L 12/24* | (2006.01) |
| *H04L 12/715* | (2013.01) |
| *H04L 29/08* | (2006.01) |
| *H04L 12/813* | (2013.01) |
| *H04L 12/717* | (2013.01) |
| *H04L 29/06* | (2006.01) |

(52) U.S. Cl.
CPC .............. *H04L 45/64* (2013.01); *H04L 45/42* (2013.01); *H04L 47/20* (2013.01); *H04L 67/2814* (2013.01); *H04L 41/0893* (2013.01); *H04L 67/06* (2013.01); *H04L 69/22* (2013.01)

(58) Field of Classification Search
CPC ...................................................... H04L 45/64

USPC ........................................................ 370/235
See application file for complete search history.

(56) References Cited

U.S. PATENT DOCUMENTS

| | | | |
|---|---|---|---|
| 2014/0101302 A1* | 4/2014 | Yang ................... | H04L 41/0813 709/224 |
| 2015/0138961 A1* | 5/2015 | Wijnands ............ | H04L 41/0668 370/228 |
| 2015/0381420 A1* | 12/2015 | Kompella ........... | H04L 41/0668 370/222 |
| 2017/0289216 A1* | 10/2017 | N ............................ | H04L 45/50 |
| 2017/0289217 A1* | 10/2017 | Kebler .................... | H04L 45/02 |
| 2018/0176121 A1* | 6/2018 | Jayaraman .............. | H04L 45/16 |
| 2019/0007225 A1* | 1/2019 | Nagarajan ............. | H04L 12/185 |

* cited by examiner

*Primary Examiner* — Shripal K Khajuria
(74) *Attorney, Agent, or Firm* — FisherBroyles, LLP

(57) ABSTRACT

The disclosed method may include (1) receiving, at a route server that serves an Internet exchange, a request from an autonomous system to join the Internet exchange, (2) obtaining, from the autonomous system, a policy that defines which routes pertaining to the autonomous system are to be shared with additional autonomous systems that have joined the Internet exchange, (3) obtaining, from the autonomous system, a plurality of routes pertaining to the autonomous system, (4) storing, at the route server, the plurality of routes pertaining to the autonomous system, and then (5) advertising at least a portion of the plurality of routes to at least one of the additional autonomous systems in accordance with the policy obtained from the autonomous system. Various other apparatuses, systems, and methods are also disclosed.

20 Claims, 6 Drawing Sheets

APPARATUS, SYSTEM, AND METHOD FOR IMPROVING THE PROCESS OF ESTABLISHING PEERING RELATIONSHIPS VIA INTERNET EXCHANGES

BACKGROUND

Internet exchanges are often used by Internet Service Providers (ISPs) and/or Content Delivery Networks (CDNs) to exchange Internet traffic across autonomous systems. In one example, an Internet exchange may include and/or represent a physical infrastructure that enables autonomous systems to access services provided by one another. Unfortunately, traditional Internet exchanges may have certain limitations and/or shortcomings that make joining and/or accessing certain services somewhat difficult.

As an example, an ISP may want to join an Internet exchange and share certain services with other members of the Internet exchange. To accomplish these goals, the ISP may need to gain access to the Internet exchange's infrastructure Local Area Network (LAN) service and then configure its access router to peer with the Internet exchange's route server. After completion of this configuration, the ISP's router may translate each member of the Internet exchange into a set of Border Gateway Protocol (BGP) attributes that are then attached to each route. The Internet exchange's route server may send the ISP's routes to other members of the Internet exchange. However, those members of the Internet exchange may intentionally or accidently reject the ISP's routes sent by the route server.

This process of brokering relationships between members of the Internet exchange may necessitate human intervention by all parties and/or be somewhat error-prone. The instant disclosure, therefore, identifies and addresses a need for additional apparatuses, systems, and methods that improve the process of establishing peering relationships via Internet exchanges.

SUMMARY

As will be described in greater detail below, the instant disclosure generally relates to systems and methods for improving the process of establishing peering relationships via Internet exchanges. In one example, a computer-implemented method for accomplishing such a task may include (1) receiving, at a route server that serves an Internet exchange, a request from an autonomous system to join the Internet exchange, (2) obtaining, from the autonomous system, a policy that defines which routes pertaining to the autonomous system are to be shared with additional autonomous systems that have joined the Internet exchange, (3) obtaining, from the autonomous system, a plurality of routes pertaining to the autonomous system, (4) storing, at the route server, the plurality of routes pertaining to the autonomous system, and then (5) advertising at least a portion of the plurality of routes to at least one of the additional autonomous systems in accordance with the policy obtained from the autonomous system.

Similarly, a system that performs the above-described method may include various modules that are stored in memory and/or executed by a physical processor. For example, such a system may include and/or represent a route server that serves an Internet exchange. This route serer may include (1) an obtaining module that (A) receives a request from an autonomous system to join the Internet exchange, (B) obtains, from the autonomous system, a policy that defines which routes pertaining to the autonomous system are to be shared with additional autonomous systems that have joined the Internet exchange, and (C) obtains, from the autonomous system, a plurality of routes pertaining to the autonomous system, (2) a storage module, stored in memory at the route server, that stores the plurality of routes pertaining to the autonomous system, and (3) an advertising module, stored in memory at the route server, that advertises at least a portion of the plurality of routes to at least one of the additional autonomous systems in accordance with the policy obtained from the autonomous system.

In some examples, an apparatus that performs the above-described method may include (1) at least one physical storage device configured to store routes in connection with an Internet exchange and (2) at least one physical processing device that is communicatively connected to the physical storage device, wherein the physical processing device (A) receives, at a route server that serves the Internet exchange, a request from an autonomous system to join the Internet exchange, (B) obtains, from the autonomous system, a policy that defines which routes pertaining to the autonomous system are to be shared with additional autonomous systems that have joined the Internet exchange, (C) obtains, from the autonomous system, a plurality of routes pertaining to the autonomous system, (D) stores, at the route server, the plurality of routes pertaining to the autonomous system, and then (E) advertises at least a portion of the plurality of routes to at least one of the additional autonomous systems in accordance with the policy obtained from the autonomous system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
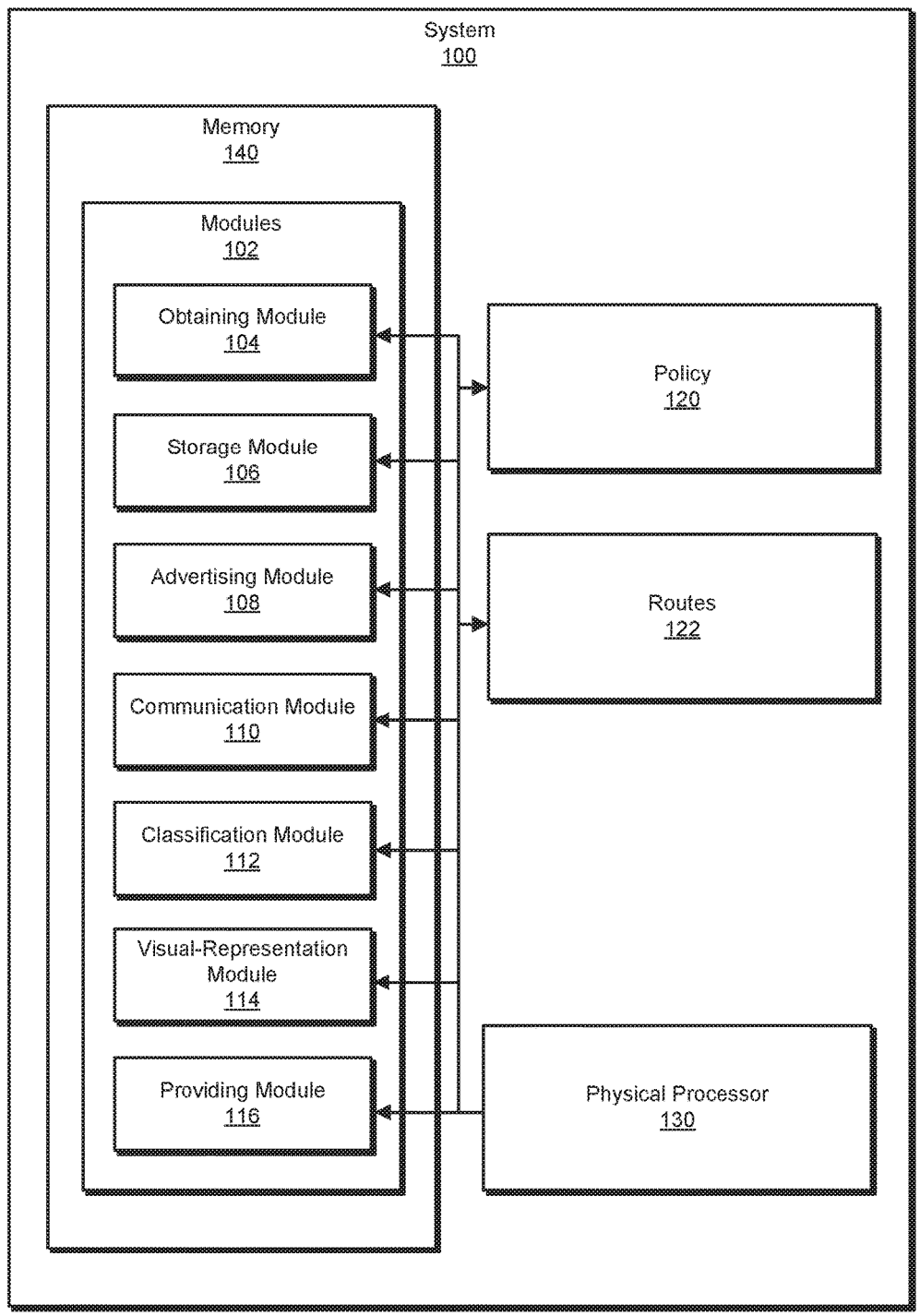
FIG. 1 is a block diagram of an exemplary system for improving the process of establishing peering relationships via Internet exchanges.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for improving the process of establishing peering relationships via Internet exchanges. As will be explained in greater detail below, embodiments of the instant disclosure may enable ISPs and/or CDNs to peer with one another via an Internet exchange. However, rather than brokering such peering relationships by way of tedious and/or complicated human intervention on both sides, the embodiments of the instant disclosure may facilitate a more social media-esque approach to joining the Internet exchange and/or providing or accessing services via the Internet exchange. By doing so, these embodiments may enable ISPs and/or CDNs to "friend" one another and/or share data or services with one another more efficiently, thereby effectuating and/or realizing a more natural scheme of establishing and/or maintaining peering relationships among members of the Internet exchange. As a result, the Internet exchange may be able to achieve and/or move closer toward its primary purpose and/or intent without some of the encumbrances that currently impede performance and/or progress.

The term "Internet exchange," as used herein, generally refers to a physical infrastructure that enables ISPs and/or CDNs to exchange Internet traffic directly with one another across autonomous systems. In some contexts, the term "Internet exchange" may be used interchangeably and/or synonymously with the term "Internet exchange point". Examples of such Internet exchanges include, without limitation, the London Internet Exchange (LINX), the Amsterdam Internet Exchange (AMS-IX), the Hong Kong Internet Exchange (HKIX), the National Internet Exchange of India (NIXI), variations or combinations of one or more of the same, and/or any other suitable Internet exchanges.

The primary purpose and/or intent of an Internet exchange may be to allow ISPs and/or CDNs to interconnect directly with one another via the Internet exchange community rather than interconnecting indirectly via one or more third-party networks. Each ISP and/or CDN may correspond to and/or operate an autonomous system that represents a member or potential member of the Internet exchange.

The following will provide, with reference to FIGS. 1, 2, 4, and 5, examples of exemplary systems for improving the process of establishing peering relationships via Internet exchanges. Detailed descriptions of corresponding computer-implemented methods will be provided in connection with FIG. 3. Finally, detailed descriptions of an exemplary computing system capable of implementing one or more of the embodiments described herein will be provided in connection with FIG. 6.

FIG. 1 is a block diagram of an exemplary system 100 for improving the process of establishing peering relationships via Internet exchanges. As illustrated in this figure, exemplary system 100 may include one or more modules 102 for performing one or more tasks. As will be explained in greater detail below, modules 102 may include an obtaining module 104, a storage module 106, an advertising module 108, a communication module 110, a classification module 112, a visual-representation module 114, and a providing module 116. Although illustrated as separate elements, one or more of modules 102 in FIG. 1 may represent portions of a single module or application. In one example, an apparatus for improving the process of establishing peering relationships may include and/or represent some or all of the components from system 100.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., route server 206 and/or one or more of autonomous systems 202(1)-(N)). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate improving the process of establishing peering relationships via Internet exchanges. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, exemplary system 100 may also include one or more policies, such as policy 120. In some examples, policy 120 may correspond to a specific ISP, CDN, and/or autonomous system that has joined an Internet exchange. In such examples, policy 120 may define which data, routes, and/or services are to be shared with other ISPs, CDNs, and/or autonomous systems that have joined the Internet exchange. Policy 120 may identify one or more ISPs, CDNs, and/or autonomous systems that are to receive certain data, routes, and/or services via the Internet exchange.

In some examples, policy 120 may carve out and/or identify which autonomous systems that have joined the Internet exchange are to receive which data, routes, and/or services. In one example, policy 120 may identify a specific ISP, CDN, and/or autonomous system that is to receive all routes that (1) originated from the ISP, CDN, and/or autonomous system to which policy 120 corresponds and (2) are of a certain route type. In another example, policy 120 may indicate that all autonomous systems of a certain service-provider type are to receive all routes that (1) originated from the ISP, CDN, and/or autonomous system to which policy 120 corresponds and (2) are of a certain route type.

Policy 120 may identify and/or indicate which autonomous systems are to receive which routes in a number of different ways. In one example, policy 120 may serve and/or be thought of as a privacy policy. For example, policy 120 may classify some routes as being of a certain type. In this example, policy 120 may indicate that all routes of that type are to be shared with all other autonomous systems that have joined the Internet exchange. Alternatively, policy 120 may indicate that all routes of that type are to be shared with all other autonomous systems of a certain type. Accordingly, policy 120 may define how to distribute and/or advertise routes in a variety of ways and/or with varying levels of granularity.

As illustrated in FIG. 1, exemplary system 100 may also include one or more routes, such as routes 122. In some examples, routes 122 may correspond to a specific ISP, CDN, and/or autonomous system that has joined an Internet exchange. In such examples, routes 122 may each identify, define, and/or correspond to any type or form of information, data, and/or representation that indicates and/or identifies a path within a network and/or across networks.

The term "path," as used herein, generally refers to any series of links and/or devices that facilitate communication and/or the flow of traffic between a source and a destination within a network and/or across networks. Each route may indicate and/or identify various information and/or data representative of a path. Examples of such information and/or data include, without limitation, the Internet Protocol (IP) address of the destination device, the IP address of a gateway device, a routing prefix of the destination or gateway device, the IP address of the next hop, a network mask, combinations or variations of one or more of the same, and/or any other suitable information or data.

In some examples, some or all of routes 122 may facilitate access to one or more services provided by the corresponding ISP, CDN, and/or autonomous system. Examples of such services include, without limitation, data delivery, search-engine services, route distribution, connectivity services, media streaming and/or exchange services, web-object delivery, downloadable-object delivery, e-commerce services, application delivery, on-demand media delivery, social-media services, voice gateways, CDN assets, combinations and/or variations of one or more of the same, and/or any other suitable services.

Figure 2:
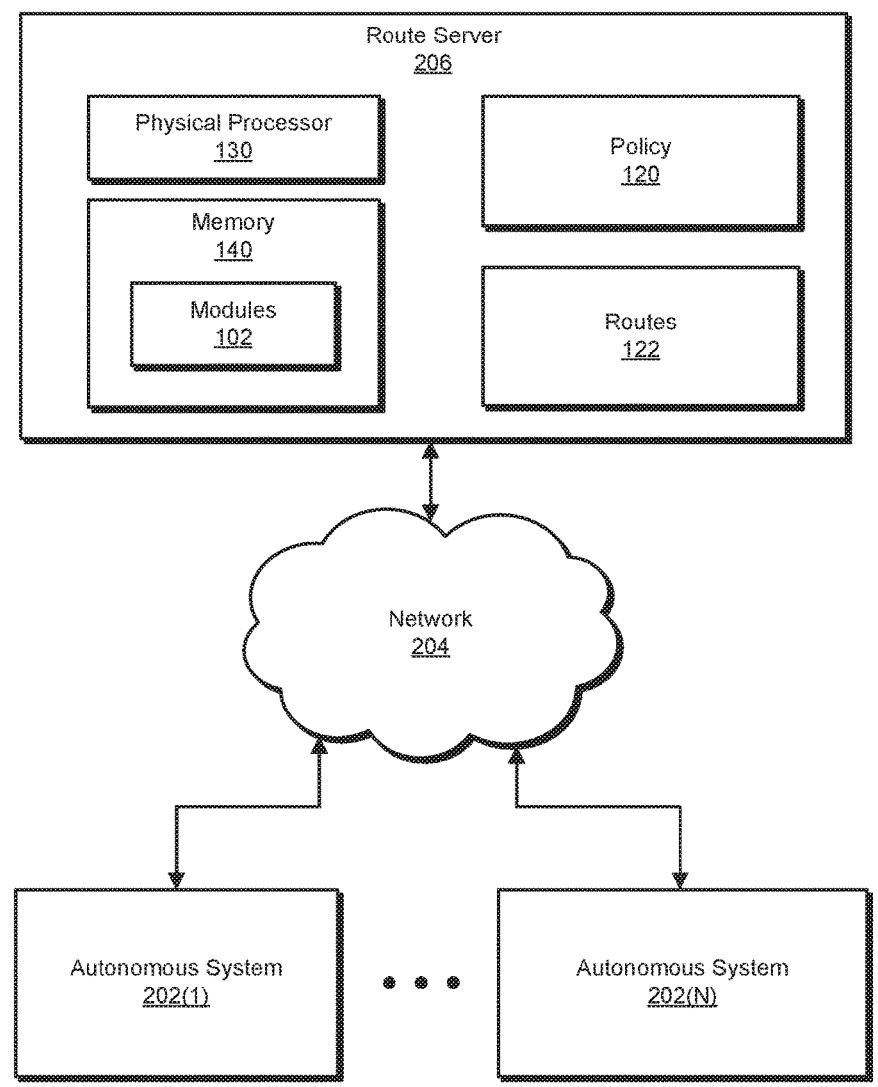
FIG. 2 is a block diagram of an exemplary system for improving the process of establishing peering relationships via Internet exchanges.

Exemplary system 100 in FIG. 1 may be implemented in a variety of ways. For example, all or a portion of exemplary system 100 may represent portions of exemplary system 200 in FIG. 2. As shown in FIG. 2, exemplary system 200 may include autonomous systems 202(1)-(N) in communication with a route server 206 via a network 204. In one example, all or a portion of the functionality of modules 102 may be performed by one or more of autonomous systems 202(1)-(N), route server 206, and/or any other suitable computing system (whether or not illustrated in FIG. 2). As will be described in greater detail below, one or more of modules 102 from FIG. 1 may, when executed by at least one processor of route server 206, enable route server 206 to improve the process of establishing peering relationships among autonomous systems 202(1)-(N).

For example, and as will be described in greater detail below, one or more of modules 102 may cause route server 206 to (1) receive a request from autonomous system 202(1) to join an Internet exchange, (2) obtain, from autonomous system 202(1), policy 120 that defines which routes pertaining to autonomous system 202(1) are to be shared with additional autonomous systems that have joined the Internet exchange, (3) obtain, from autonomous system 202(1), routes 122 pertaining to autonomous system 202(1), (4) store routes 122 pertaining to autonomous system 202(1), and then (5) advertise at least a portion of routes 122 to at least one of the additional autonomous systems in accordance with policy 120.

Autonomous systems 202(1)-(N) each generally represent a collection and/or network of computing devices under the control and/or administration of a single organization and/or entity. Examples of such devices include, without limitation, network devices, routers, switches, hubs, modems, bridges, repeaters, gateways, multiplexers, network adapters, network interfaces, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing devices. In one example, autonomous systems 202(1)-(N) may correspond to, represent, and/or be under the control of different ISPs and/or CDNs relative to one another. In other words, autonomous systems 202(1) and 202(N) may not both correspond to, represent, and/or be under the control of the same ISP and/or CDN as one another. For example, autonomous system 202(1) may belong to and/or be under the control and/or administration of FACEBOOK. In this example, autonomous system 202(N) may belong to and/or be under the control and/or administration of COMCAST.

Route server 206 generally represents any type or form of computing device capable of obtaining, storing, and/or distributing data and/or routes pertaining to autonomous systems that have joined and/or intend to join an Internet exchange. In one example, route server 206 may correspond to and/or represent an Internet exchange point that serves an Internet exchange. In this example, the Internet exchange itself may include and/or represent all of system 200. In other words, the Internet exchange may represent a computing community that includes all of autonomous systems 202(1)-(N) and router server 206. In this example, by distributing the routes pertaining to autonomous systems 202(1)-(N) among the same, route server 206 may effectively enable autonomous systems 202(1)-(N) to interconnect directly to one another, thereby bypassing and/or eliminating the need for any intermediary third-party networks. In doing so, route server 206 may help reduce the cost, latency, and/or bandwidth consumption or resources associated with the exchange of Internet traffic among autonomous systems 202(1)-(N).

Network 204 generally represents any medium or architecture capable of facilitating communication or data transfer. In one example, network 204 may facilitate communication among autonomous systems 202(1)-(N) and route server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
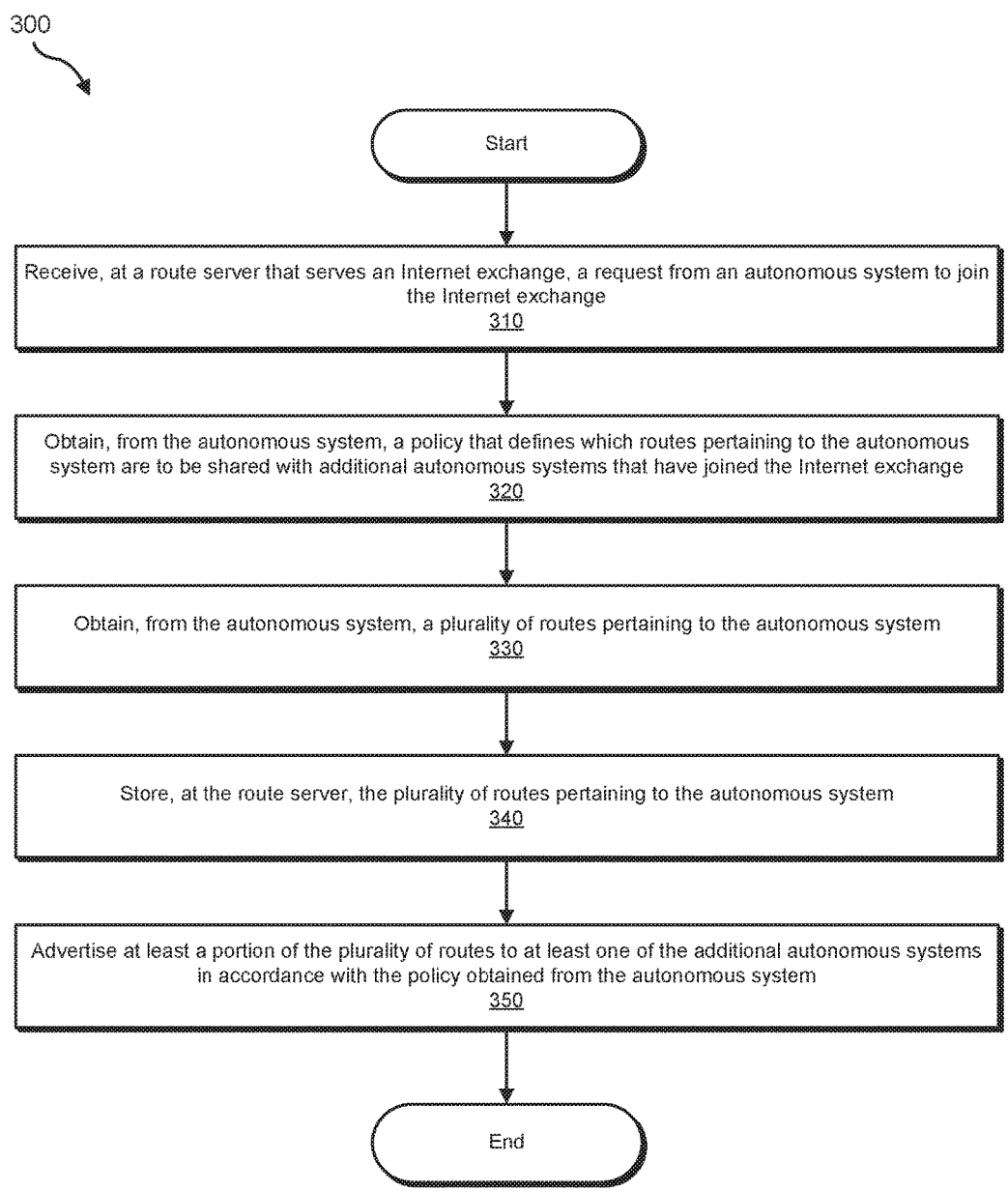
FIG. 3 is a flow diagram of an exemplary method for improving the process of establishing peering relationships via Internet exchanges.

FIG. 3 is a flow diagram of an example computer-implemented method 300 for improving the process of establishing peering relationships via Internet exchanges. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive a request from an autonomous system to join the Internet exchange. For example, obtaining module 104 may, as part of route server 206 in FIG. 2, receive a request from autonomous system 202(1) to join an Internet exchange served by route server 206. In this example, the request may represent and/or demonstrate the intent of autonomous system 202(1) to join and/or become a member of the Internet exchange. Autonomous system 202(1) may correspond to and/or be under the control of a single ISP and/or CDN.

The systems described herein may perform step 310 in a variety of ways and/or contexts. In some examples, obtaining module 104 may monitor communication ports and/or channels on route server 206 for any request and/or control signals sent by autonomous systems that have joined and/or intend to join the Internet exchange. In one example, an administrator may direct autonomous system 202(1) to send a request to join the Internet exchange to route server 206 via network 204. As the request arrives at and/or reaches route server 206 from autonomous system 202(1), obtaining module 104 may detect and/or receive the request.

In some examples, the request may cause and/or trigger the establishment of a communication session between route server 206 and autonomous system 202(1). For example, in response to the receipt of the request at route server 206, communication module 110 may, as part of route server 206, establish a BGP session (e.g., an external BGP session) between route server 206 and autonomous system 202(1). As will be described in greater detail below, through this BGP session, autonomous system 202(1) may be able to provide route server 206 with copies of routes that facilitate access to services provided by the ISP and/or CDN to which autonomous system 202(1) corresponds.

For example, autonomous system 202(1) may copy routes for its services to a local Routing Information Base (RIB) on route server 206. In this example, the RIB on route server 206 may be specific to and/or designated for storing and/or maintaining the routes corresponding to autonomous system 202(1). By storing those routes in a local RIB specific to autonomous system 202(1), route server 206 may be able to share and/or distribute some or all of those routes to other autonomous systems that have joined the Internet exchange.

Route server 206 may simplify external BGP (eBGP) peering via the Internet exchange. For example, each of autonomous systems 202(1)-(N) may maintain only a single eBGP session with route server 206, as opposed to maintaining an eBGP session with every other member of the Internet exchange. In this way, route server 206 may be able to provide AS paths (which indicate the autonomous systems that routing information has traversed), Multi-Exit Discriminator (MED) attributes, and/or next hops to autonomous systems 202(1)-(N) such that peering autonomous systems 202(1)-(N) appear to be directly connected to one another even though route server 206 sits and/or resides between them.

Returning to FIG. 3, at step 320 one or more of the systems described herein may obtain a policy that defines which routes pertaining to the autonomous system are to be shared with additional autonomous systems that have joined the Internet exchange. For example, obtaining module 104 may, as part of route server 206 in FIG. 2, obtain policy 120 from autonomous system 202(1). In this example, policy 120 may define which routes pertaining to autonomous system 202(1) are to be shared with additional autonomous systems that have joined the Internet exchange.

The systems described herein may perform step 320 in a variety of ways and/or contexts. In some examples, obtaining module 104 may obtain policy 120 via the same communication port and/or channel that facilitated the transmission of the request to join the Internet exchange. In one example, an administrator of autonomous system 202(1) may formulate, devise, and/or create policy 120. For example, the administrator may decide which of routes 122 are to be shared with and/or distributed to certain autonomous systems within the Internet exchange. In this example, autonomous system 202(1) may generate policy 120, which identifies and/or captures those decisions by the administrator.

Autonomous system 202(1) may then send policy 120 to route server 206 via network 204. In one example, autonomous system 202(1) may transfer policy 120 to route server 206 through the BGP session established between route server 206 and autonomous system 202(1). As policy 120 arrives at and/or reaches route server 206 from autonomous system 202(1), obtaining module 104 may detect and/or receive policy 120. As will be described in greater detail below, policy 120 may control which of routes 122 are shared with and/or distributed to certain autonomous systems within the Internet exchange.

Returning to FIG. 3, at step 330 one or more of the systems described herein may obtain a plurality of routes pertaining to the autonomous system. For example, obtaining module 104 may, as part of route server 206 in FIG. 2, obtain routes 122 from autonomous system 202(1). In this example, routes 122 may pertain, correspond, and/or be unique to autonomous system 202(1). More specifically, routes 122 may each lead and/or facilitate access to a service provided by autonomous system 202(1) and/or the corresponding ISP and/or CDN.

The systems described herein may perform step 330 in a variety of ways and/or contexts. In some examples, obtaining module 104 may obtain routes 122 via the same communication port and/or channel that facilitated the transmission of policy 120 and/or the request to join the Internet exchange. In one example, autonomous system 202(1) may copy routes 122 from its RIB and then send those copies to route server 206 via network 204. For example, autonomous system 202(1) may transfer policy 120 to route server 206 through the BGP session established between route server 206 and autonomous system 202(1). As the copies of routes 122 arrive at and/or reach route server 206 from autonomous system 202(1), obtaining module 104 may detect and/or receive those copies.

Returning to FIG. 3, at step 340 one or more of the systems described herein may store the plurality of routes pertaining to the autonomous system. For example, storage module 106 may, as part of route server 206 in FIG. 2, store routes 122 locally on route server 206. By storing routes 122 locally, route server 206 may be able to distribute routes pertaining to autonomous system 202(1) to other autonomous systems within the Internet exchange in accordance with policy 120.

The systems described herein may perform step 340 in a variety of ways and/or contexts. In some examples, storage module 106 may store routes 122 in a memory location that has been allocated and/or designated for the exclusive use of autonomous system 202(1). For example, storage module 106 may create and/or allocate a RIB that is to store only routes originating from autonomous system 202(1). In this example, storage module 106 may create and/or allocate another RIB that is to store only routes originating from autonomous system 202(N). Accordingly, route server 206 may include and/or maintain a different per-member RIB for each autonomous system that joins the Internet exchange.

In some examples, policy 120 may call for categorizing routes 122 by route types. For example, some of routes 122 may correspond to different types of services. In one example, policy 120 may indicate that route server 206 is to distribute only the routes for voice gateways to a certain autonomous system. However, policy 120 may also indicate that route server 206 is to distribute only the routes for CDN assets to another autonomous system.

Accordingly, routes 122 may be categorized and/or designated based at least in part on the type of service that they provide and/or to which they facilitate access. In one example, classification module 112 may, as part of route server 206 in FIG. 2, classify and/or categorize a subset of routes 122 as being of a certain route type. For example, classification module 112 may classify and/or categorize some of routes 122 as leading to voice gateways of autonomous system 202(1). Similarly, classification module 112 may classify and/or categorize others of routes 122 as leading to CDN assets of autonomous system 202(1). These classifications and/or designations may be made based at least in part on route attributes and/or metadata received by route server 206 from autonomous system 202(1) in connection with routes 122.

In some examples, autonomous systems 202(1)-(N) may be categorized and/or designated based at least in part on the type of ISP and/or CDN that controls and/or operates autonomous systems 202(1)-(N). In one example, classification module 112 may classify and/or categorize a subset of autonomous systems 202(1) as being of a certain ISP type. For example, classification module 112 may classify and/or categorize autonomous system 202(1) as being a social-media provider. Similarly, classification module 112 may classify and/or categorize autonomous system 202(N) as being a streaming media provider. These classifications and/or designations may be made based at least in part on service attributes and/or metadata received by route server 206 from autonomous systems 202(1)-(N) as they join the Internet exchange.

In some examples, route server 206 may collect and/or obtain policies from each of autonomous systems 202(1)-(N). By doing so, route server 206 may be able to examine the policies of autonomous systems 202(1)-(N) and then determine the intents of autonomous systems 202(1)-(N) exchange based at least in part on this examination. Route server 206 may also devise and/or establish the particular peering relationship for each pair of autonomous systems 202(1)-(N) based at least in part on the respective intents of autonomous systems 202(1)-(N). Each peering relationship may translate to a specific device and/or routing configuration. Since, in these examples, the polices effectively define the ISPs' and/or CDNs' intents with the Internet exchange, each specific routing configuration may be unencumbered by the human administrators' knowledge and/or understanding of BGP code, thereby making this social media-esque approach to establishing peering relationships via the Internet exchange much simpler and/or more user-friendly than traditional approaches and/or conventions.

In some examples, the combination of policies involved in a peering relationship may effectively form and/or demonstrate the intents of the parties. These intents may translate to a specific device and/or routing configuration for each of the parties to the peering relationship. Route server 206 may compile the intents of the parties to generate and/or produce the respective device and/or routing configurations. By doing so, route server 206 may be able to describe, formulate, and/or maintain the peering relationship of the parties in terms of their intents without necessarily relying on BGP attributes (such as 32-bit and/or 128-bit addresses), thereby mitigating the need for such a high level of human knowledge and/or understanding of BGP code.

Returning to FIG. 3, at step 350 one or more of the systems described herein may advertise at least a portion of the set of routes to at least one of the additional autonomous systems in accordance with the policy obtained from the autonomous system. For example, advertising module 108 may, as part of route server 206 in FIG. 2, advertise one or more of routes 122 to autonomous system 202(N) in accordance with policy 120. The phrase "to advertise," as used herein, generally refers to the process of sharing and/or distributing routes to devices and/or autonomous systems via control signals and/or communications.

The systems described herein may perform step 350 in a variety of ways and/or contexts. In some examples, advertising module 108 may send select routes to autonomous system 202(N) based at least in part on a number of factors. In one example, advertising module 108 may determine that policy 120 indicates that autonomous system 202(N) is to receive all of routes 122 that are of a certain route type. For example, policy 120 may indicate that autonomous system 202(N) is to receive all of routes 122 that lead and/or facilitate access to voice gateways of autonomous system 202(1). In this example, advertising module 108 may identify all of routes 122 that lead and/or facilitate access to voice gateways of autonomous system 202(1). Advertising module 108 may then advertise only those identified routes to autonomous system 202(N) because policy 120 indicates that autonomous system 202(N) is to receive all of routes 122 that lead and/or facilitate access to voice gateways of autonomous system 202(1) and those identified routes lead and/or facilitate access to such voice gateways.

In another example, advertising module 108 may determine that policy 120 indicates that all autonomous systems 202(1)-(N) of a certain ISP type are to receive all of routes 122 that are of a certain route type. For example, policy 120 may indicate that all autonomous systems controlled and/or operated by social-media providers are to receive all of routes 122 that lead and/or facilitate access to digital-image assets of autonomous system 202(1). In this example, advertising module 108 may identify all of routes 122 that lead and/or facilitate access to digital-image assets of autonomous system 202(1). Advertising module 108 may then advertise only those identified routes to the autonomous systems controlled and/or operated by social-media providers because policy 120 indicates that all autonomous systems controlled and/or operated by social-media providers are to receive all of routes 122 that lead and/or facilitate access to digital-image assets of autonomous system 202(1) and those identified routes lead and/or facilitate access to such digital-image assets.

By advertising select routes to autonomous systems 202(1)-(N) in this way, one or more of modules 102 may effectively enable autonomous systems 202(1)-(N) to establish peering relationships with one another. For example, once route server 206 has advertised the appropriate routes among autonomous systems 202(1)-(N) based on their corresponding policies and/or intents, communication module 110 may, as part of autonomous system 202(N), establish and/or form a peering relationship with autonomous system 202(1) by way of the advertised routes. Autonomous systems 202(1)-(N) may then exchange traffic with one another and/or access each other's services by way of these routes.

Figure 4:
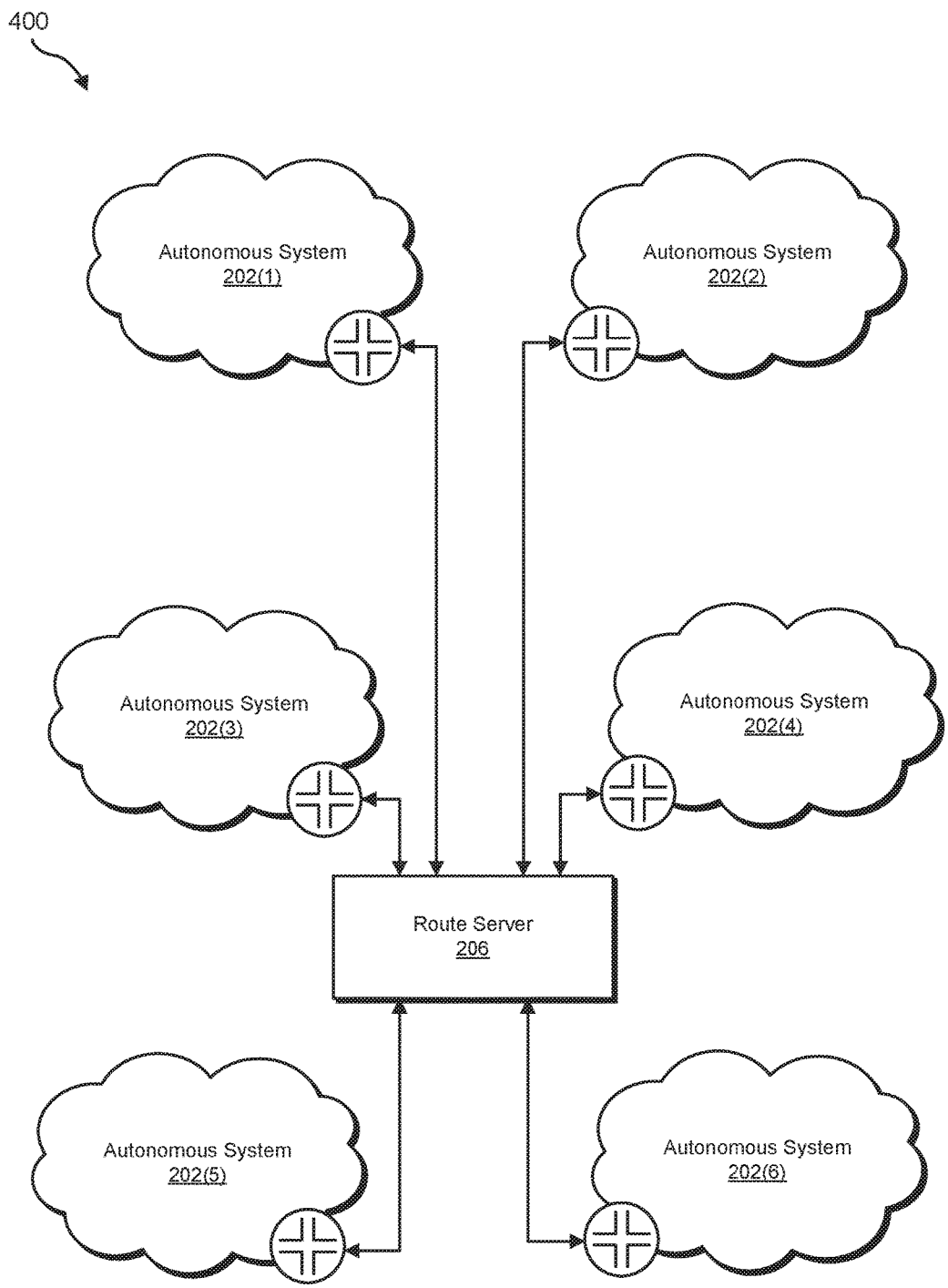
FIG. 4 is a block diagram of an exemplary system for improving the process of establishing peering relationships via Internet exchanges.

FIG. 4 is a block diagram of an exemplary system 400 for improving the process of establishing peering relationships via Internet exchanges. As illustrated in FIG. 4, exemplary system 400 may include route server 206 and autonomous systems 202(1), 202(2), 202(3), 202(4), 202(5), and 202(6). In some examples, autonomous systems 202(1)-(6) and route server 206 may collectively represent and/or form an Internet exchange. In one example, autonomous systems 202(1)-(6) may each join the Internet exchange by sending requests for the same to route server 206. Upon receiving such requests, route server 206 may establish an eBGP session with each of autonomous systems 202(1)-(6). Through these eBGP sessions, autonomous systems 202(1)-(6) may send copies of the routes included in their respective RIBs to route server 206.

Additionally or alternatively, through these eBGP sessions, autonomous systems 202(1)-(6) may send their respective policies to route server 206. As described above, these policies may define how to distribute corresponding routes to the other autonomous systems within the Internet exchange. For example, the policy created and/or sent by autonomous system 202(2) may define and/or indicate which routes pertaining to autonomous system 202(2) are to be advertised to autonomous systems 202(1) and 202(3)-(6). As another example, the policy created and/or sent by autonomous system 202(6) may define and/or indicate which routes pertaining to autonomous system 202(6) are to be advertised to autonomous systems 202(1)-(5). Route server 206 may then advertise certain routes among autonomous systems 202(1)-(6) in accordance with the respective policies collected and/or obtained from autonomous systems 202(1)-(6).

Figure 5:
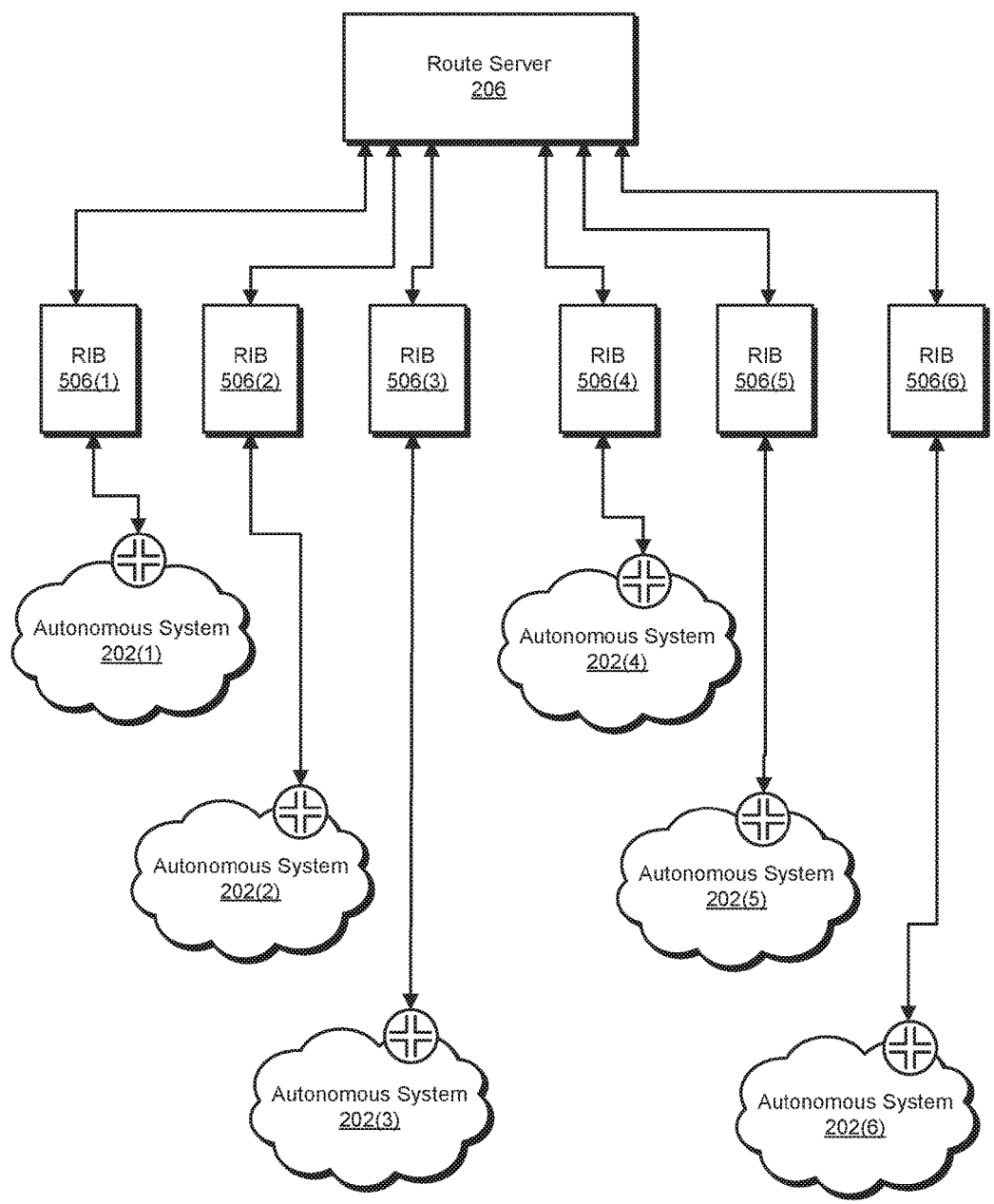
FIG. 5 is a block diagram of an exemplary system for improving the process of establishing peering relationships via Internet exchanges.

FIG. 5 is a block diagram of an exemplary system 500 for improving the process of establishing peering relationships via Internet exchanges. As illustrated in FIG. 5, exemplary system 500 may include route server 206 and autonomous systems 202(1)-(6). In this example, route server 206 may allocate and/or maintain a separate RIB for each of autonomous systems 202(1)-(N). For example, route server 206 may allocate and/or maintain a RIB 506(1) for routes originating from autonomous system 202(1), a RIB 506(2) for routes originating from autonomous system 202(2), a RIB 506(3) for routes originating from autonomous system 202(3), a RIB 506(4) for routes originating from autonomous system 202(4), a RIB 506(5) for routes originating from autonomous system 202(5), and a RIB 506(6) for routes originating from autonomous system 202(6). Although RIBs 506(1)-(6) are illustrated as being external to route server 206 in FIG. 5, RIBs 506(1)-(6) may each be included, contained, and/or stored within route server 206.

In some examples, statistics and/or visual representations of traffic exchanged across the Internet exchange may be provided and/or distributed to autonomous systems 202(1)-(6). For example, communication module 110 may, as part of route server 206 in FIG. 4 or 5, monitor traffic exchanged among autonomous systems 202(1)-(6). In this example, communication module 110 may record per-member and/or per-route traffic statistics about traffic exchanged among autonomous systems 202(1)-(6). These statistics may even indicate and/or identify the amount of traffic generated by and/or traversing specific routes within the Internet exchange.

In some examples, visual-representation module 114 may, as part of route server 206 in FIG. 4 or 5, generate a visual representation of one or more peering relationships established between at least some of autonomous systems 202(1)-(6). For example, visual-representation module 114 may incorporate at least a portion of the recorded traffic statistics into the visual representation of the peering relationships. Examples of such a visual representation include, without limitation, graphs, line charts, text-based statistics, pie charts, pictograms, histograms, bar charts, mosaic charts, population pyramids, spider charts, scatter plots, radar charts, contour graphs, circular routing graphs, combinations or variations of one or more of the same, and/or any other suitable visual representation.

In one example, the visual representation may include, incorporate, and/or identify various information about the peering relationships within the Internet exchange. Examples of such information include, without limitation, dates and/or times that certain autonomous systems established a peering relationship with one another, the number and/or identities of autonomous systems that have joined the Internet exchange, the amount of traffic exchanged between certain autonomous systems that have joined the Internet exchange, the amount of traffic exchanged along and/or traversing a particular route, the identity of the autonomous system to which a particular route pertains, telemetry data related to the autonomous systems that have joined the Internet exchange, combinations or variations of one or more of the same, and/or any other suitable information about peering relationships.

In some examples, providing module 116 may, as part of route server 206 in FIG. 4 or 5, provide the visual representation to one or more of autonomous systems 202(1)-(6). For example, providing module 116 may send the visual representation to autonomous system 202(1) for presentation to an administrator. Upon receiving the visual representation, autonomous system 202(1) may present and/or display the visual representation to an administrator. By doing so, autonomous system 202(1) may enable the administrator to examine and/or visualize the traffic patterns and/or distributions among the members of the Internet exchange.

In some examples, the administrator may also decide to modify and/or change the policy for autonomous system 202(1) based at least in part on the information and/or statistics conveyed in the visual representation. Additionally or alternatively, the administrator may decide to request certain routes and/or access to corresponding services provided by other members of the Internet exchange based at least in part on the information and/or statistics conveyed in the visual representation.

In one example, autonomous system 202(1) may receive input from the administrator in response to the presentation of the visual representation. In this example, the input may be directed to modifying and/or changing the policy for autonomous system 202(1) in view of the administrator's examination of the visual representation. Autonomous system 202(1) may then send this input to route server 206 to facilitate updating the policy for autonomous system 202(1). Additionally or alternatively, autonomous system 202(1) may update its policy based at least in part on the input and then send this updated policy to route server 206 for implementation.

In one example, route server 206 may receive a request for additional routes from the administrator of autonomous system 202(1). These additional routes may correspond to one or more of autonomous systems 202(2)-(6). These additional routes may have been previously unavailable to autonomous system 202(1). As a result, autonomous system 202(1) may have been unable to access the services provided via those routes. In response to this request, route server 206 may attempt to obtain approval from the corresponding autonomous system(s) to distribute the requested routes to autonomous system 202(1). Additionally or alternatively, route server 206 may broker route-exchange negotiations between autonomous system 202(1) and the autonomous system(s) to which the requested routes correspond.

In any case, route server 206 may advertise the requested routes to autonomous system 202(1) if and/or when the corresponding autonomous system(s) have approved the request. In other words, in response to acceptance of the request by the corresponding autonomous system(s), route server 206 may send the requested routes to autonomous system 202(1) via their eBGP session.

Figure 6:
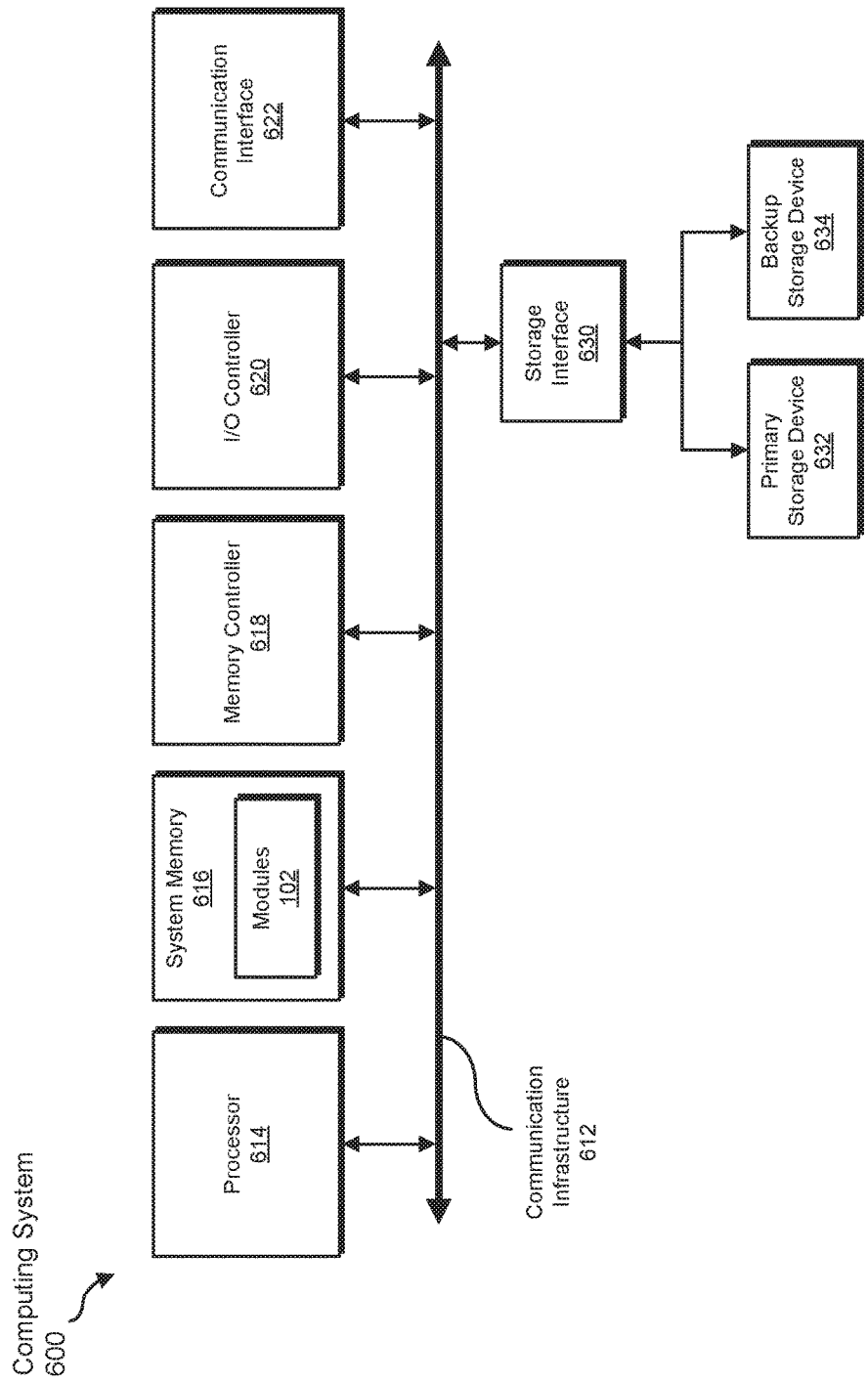
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at a route server that serves an Internet exchange, a request from an autonomous system to join the Internet exchange;
   obtaining, from the autonomous system, a policy that defines which routes pertaining to the autonomous system are to be shared with additional autonomous systems that have joined the Internet exchange;
   obtaining, from the autonomous system, a plurality of routes pertaining to the autonomous system;
   storing, at the route server, the plurality of routes pertaining to the autonomous system; and
   advertising at least a portion of the plurality of routes to at least one of the additional autonomous systems in accordance with the policy obtained from the autonomous system.

2. The method of claim 1, further comprising, in response to receiving the request from the autonomous system to join the Internet exchange, establishing a Border Gateway Protocol (BGP) session between the route server and the autonomous system; and
   wherein obtaining the plurality of routes pertaining to the autonomous system comprises obtaining the plurality of routes from the autonomous system via the BGP session established between the route server and the autonomous system.

3. The method of claim 1, further comprising categorizing a subset of the routes as being of a certain route type.

4. The method of claim 3, wherein:
   the policy identifies a specific autonomous system that is to receive all routes obtained from the autonomous system that are of the certain route type; and
   advertising the portion of the plurality of routes to the at least one of the additional autonomous systems comprises advertising the subset of routes to the specific autonomous system due at least in part to:
      the policy indicating that the specific autonomous system is to receive all routes from the autonomous system that are of the certain route type; and
      the subset of routes are of the certain route type.

5. The method of claim 3, further comprising categorizing the at least one of the additional autonomous systems as being of a certain service-provider type; and
   wherein:
      the policy indicates that all additional autonomous systems of the certain service-provider type are to receive all routes obtained from the autonomous system that are of the certain route type; and
      advertising the portion of the plurality of routes to the at least one of the additional autonomous systems comprises advertising the subset of routes to the at least one of the additional autonomous system due at least in part to:
         the policy indicating that all additional autonomous systems of the certain service-provider type are to receive all routes obtained from the autonomous system that are of the certain route type; and
         the at least one of the additional autonomous systems are of the certain service-provider type.

6. The method of claim 1, wherein the plurality of routes stored at the route server facilitate access to services provided by the autonomous system.

7. The method of claim 1, further comprising:
   enabling, by way of the route server, the autonomous system and the at least one of the additional autonomous systems to establish a peering relationship with one another; and
   obtaining, from the at least one of the additional autonomous systems, a policy that defines which routes pertaining to the at least one of the additional autonomous systems are to be shared with the autonomous system;
   obtaining, from the at least one of the additional autonomous systems, a set of routes pertaining to the at least one of the additional autonomous systems;
   storing, at the route server, the set of routes pertaining to the at least one of the additional autonomous systems; and
   advertising at least a portion of the set of routes to the autonomous system in accordance with the policy obtained from the at least one of the additional autonomous systems.

8. The method of claim 1, further comprising:
   generating a visual representation of one or more peering relationships established between the additional autonomous systems that have joined the Internet exchange; and
   providing the visual representation of the peering relationships to the autonomous system for presentation to an administrator of the autonomous system.

9. The method of claim 8, wherein generating the visual representation of the peering relationships comprises:
   recording traffic statistics about traffic exchanged between the additional autonomous systems; and
   incorporating at least a portion of the recorded traffic statistics into the visual representation of the peering relationships.

10. The method of claim 8, further comprising:
    receiving input from the administrator of the autonomous system in response to the presentation of the visual representation to the administrator; and
    updating the policy that defines which routes are to be shared with the additional autonomous systems based at least in part on the input received from the administrator.

11. The method of claim 8, further comprising:
    receiving input from the administrator of the autonomous system in response to the presentation of the visual representation to the administrator;
    requesting, from one or more of the additional autonomous systems, one or more routes for distribution to the autonomous system based at least in part on the input received from the administrator;

in response to acceptance of the request by the one or more of the additional autonomous systems, advertising the requested routes to the autonomous system.

12. A system comprising:

an obtaining module, stored in memory at a route server that serves an Internet exchange, that:
  receives a request from an autonomous system to join the Internet exchange;
  obtains, from the autonomous system, a policy that defines which routes pertaining to the autonomous system are to be shared with additional autonomous systems that have joined the Internet exchange; and
  obtains, from the autonomous system, a plurality of routes pertaining to the autonomous system;
a storage module, stored in memory at the route server, that stores the plurality of routes pertaining to the autonomous system;
an advertising module, stored in memory at the route server, that advertises at least a portion of the plurality of routes to at least one of the additional autonomous systems in accordance with the policy obtained from the autonomous system; and
at least one physical processor configured to execute the obtaining module, the storage module, and the advertising module.

13. The system of claim 12, further comprising a communication module, stored in memory at the route server, that establishes a Border Gateway Protocol (BGP) session between the route server and the autonomous system in response to receiving the request from the autonomous system to join the Internet exchange; and
  wherein the receiving module obtains the plurality of routes from the autonomous system via the BGP session established between the route server and the autonomous system.

14. The system of claim 12, further comprising a classification module, stored in memory at the route server, that categorizes a subset of the routes as being of a certain route type.

15. The system of claim 14, wherein:
  the policy identifies a specific autonomous system that is to receive all routes obtained from the autonomous system that are of the certain route type; and
  the advertising module advertises the subset of routes to the specific autonomous system due at least in part to:
    the policy indicating that the specific autonomous system is to receive all routes from the autonomous system that are of the certain route type; and
    the subset of routes are of the certain route type.

16. The system of claim 14, further comprising a classification module, stored in memory at the route server, that categorizes the at least one of the additional autonomous systems as being of a certain service-provider type; and
  wherein:
    the policy indicates that all additional autonomous systems of the certain service-provider type are to receive all routes obtained from the autonomous system that are of the certain route type; and
    the advertising module advertises the subset of routes to the at least one of the additional autonomous system due at least in part to:
      the policy indicating that all additional autonomous systems of the certain service-provider type are to receive all routes obtained from the autonomous system that are of the certain route type; and
      the at least one of the additional autonomous systems are of the certain service-provider type.

17. The system of claim 12, wherein the plurality of routes stored at the route server facilitate access to services provided by the autonomous system.

18. The system of claim 12, further comprising:
  a communication module, stored in memory at the route server, that enables the autonomous system and the at least one of the additional autonomous systems to establish a peering relationship with one another; and
  wherein:
    the receiving module:
      obtains, from the at least one of the additional autonomous systems, a policy that defines which routes pertaining to the at least one of the additional autonomous systems are to be shared with the autonomous system;
      obtains, from the at least one of the additional autonomous systems, a set of routes pertaining to the at least one of the additional autonomous systems;
    the storage module stores the set of routes pertaining to the at least one of the additional autonomous systems; and
    the advertising module advertises at least a portion of the set of routes to the autonomous system in accordance with the policy obtained from the at least one of the additional autonomous systems.

19. The system of claim 12, further comprising:
  a visual-representation module, stored in memory, that generates a visual representation of one or more peering relationships established between the additional autonomous systems that have joined the Internet exchange; and
  a providing module, stored in memory, that provides the visual representation of the peering relationships to the autonomous system for presentation to an administrator of the autonomous system.

20. An apparatus comprising:
at least one physical storage device configured to store routes in connection with an Internet exchange; and
at least one physical processing device that is communicatively connected to the physical storage device, wherein the physical processing device:
  receives, at a route server that serves the Internet exchange, a request from an autonomous system to join the Internet exchange;
  obtains, from the autonomous system, a policy that defines which routes pertaining to the autonomous system are to be shared with additional autonomous systems that have joined the Internet exchange;
  obtains, from the autonomous system, a plurality of routes pertaining to the autonomous system;
  stores, at the route server, the plurality of routes pertaining to the autonomous system; and
  advertises at least a portion of the plurality of routes to at least one of the additional autonomous systems in accordance with the policy obtained from the autonomous system.

* * * * *